United States Patent
Abdulkader et al.

(10) Patent No.: US 8,331,739 B1
(45) Date of Patent: Dec. 11, 2012

(54) EFFICIENT IDENTIFICATION AND CORRECTION OF OPTICAL CHARACTER RECOGNITION ERRORS THROUGH LEARNING IN A MULTI-ENGINE ENVIRONMENT

(75) Inventors: Ahmad Abdulkader, San Jose, CA (US); Matthew R. Casey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 996 days.

(21) Appl. No.: 12/357,367

(22) Filed: Jan. 21, 2009

(51) Int. Cl.
| | |
|---|---|
| G06K 9/00 | (2006.01) |
| G06K 9/62 | (2006.01) |
| G06K 9/34 | (2006.01) |
| G06K 9/03 | (2006.01) |
| G06K 7/10 | (2006.01) |
| G06K 1/00 | (2006.01) |
| G06K 15/02 | (2006.01) |
| G06F 17/30 | (2006.01) |
| G06F 7/00 | (2006.01) |
| G06F 17/28 | (2006.01) |
| G06F 15/00 | (2006.01) |
| H04N 1/40 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |

(52) U.S. Cl. ........ 382/311; 382/100; 382/159; 382/176; 382/225; 382/321; 715/256; 707/736; 358/1.11; 358/462

(58) Field of Classification Search .......... 382/100–102, 382/105, 155, 159, 173–179, 181–182, 185–205, 382/224–225, 229–231, 309–311, 321–324; 715/255–259, 271–272; 707/736; 358/1.11, 358/462
See application file for complete search history.

(56) References Cited

U.S. PATENT DOCUMENTS

| | | | | |
|---|---|---|---|---|
| 5,805,747 | A | * 9/1998 | Bradford | 382/310 |
| 2006/0285746 | A1 | * 12/2006 | Yacoub et al. | 382/176 |

(Continued)

OTHER PUBLICATIONS

S. M. Beitzel, E. C. Jensen, and D. A. Grossman. A survey of retrieval strategies for ocr text collections. In Proceedings of the Symposium on Document Image Understanding Technologies, Greenbelt, Maryland, Apr. 2003.*

(Continued)

*Primary Examiner* — Anand Bhatnagar
*Assistant Examiner* — Nathan Bloom
(74) *Attorney, Agent, or Firm* — Fenwick & West LLP

(57) ABSTRACT

OCR errors are identified and corrected through learning. An error probability estimator is trained using ground truths to learn error probability estimation. Multiple OCR engines process a text image, and convert it into texts. The error probability estimator compares the outcomes of the multiple OCR engines for mismatches, and determines an error probability for each of the mismatches. If the error probability of a mismatch exceeds an error probability threshold, a suspect is generated and grouped together with similar suspects in a cluster. A question for the cluster is generated and rendered to a human operator for answering. The answer from the human operator is then applied to all suspects in the cluster to correct OCR errors in the resulting text. The answer is also used to further train the error probability estimator.

18 Claims, 6 Drawing Sheets

U.S. PATENT DOCUMENTS

| | | | | |
|---|---|---|---|---|
| 2006/0285749 A1* | 12/2006 | Eisenhart et al. | | 382/188 |
| 2008/0063279 A1* | 3/2008 | Vincent et al. | | 382/182 |
| 2008/0212877 A1* | 9/2008 | Franco | | 382/182 |
| 2011/0239111 A1* | 9/2011 | Grover | | 715/257 |

OTHER PUBLICATIONS

Venu Govindaraju, Huaigu Cao, and Anurag Bhardwaj. 2009. Handwritten document retrieval strategies. In Proceedings of the Third Workshop on Analytics for Noisy Unstructured Text Data (AND '09). ACM, New York, NY, USA.*

Martin Reynaert. 2008. Non-interactive OCR post-correction for giga-scale digitization projects. In Proceedings of the 9th international conference on Computational linguistics and intelligent text processing (CICLing'08), Alexander Gelbukh (Ed.). Springer-Verlag, Berlin, Heidelberg, 617-630.*

Ohta, M.; Takasu, A.; Adachi, J.; , "Retrieval methods for English-text with missrecognized OCR characters," Document Analysis and Recognition, 1997., Proceedings of the Fourth International Conference on , vol. 2, no., pp. 950-956 vol. 2, Aug. 18-20, 1997.*

Abdulkader, A., et al., "Low Cost Correction of OCR Errors Using Learning in a Multi-Engine Environment," IEEE 10th International Conference on Document Analysis and Recognition, 2009, pp. 576-580.

Klein, S., et al., "A Voting System for Automatic OCR Correction," Workshop on Information Retrieval and OCR, 2002, pp. 1-19, can be retrieved from the internet <URL:http://hartford.lti.cs.cmu.edu/callan/Workshops/IR>.

* cited by examiner

EFFICIENT IDENTIFICATION AND CORRECTION OF OPTICAL CHARACTER RECOGNITION ERRORS THROUGH LEARNING IN A MULTI-ENGINE ENVIRONMENT

BACKGROUND

1. Field of Disclosure

The disclosure generally relates to the field of optical character recognition (OCR), in particular to OCR output quality improvement.

2. Description of the Related Art

Digitizing printed documents (e.g., books, newspapers) typically involves image scanning, which generates images of the printed documents, and optical character recognition (OCR), which converts the images into editable text. Due to imperfections in the documents, artifacts introduced during the scanning process, and shortcomings of OCR applications (hereinafter called OCR engines), errors often exist in the output text. The word level accuracy rates of current OCR engines range between 80% and 95% for Latin script based languages. These accuracy rates meet the demands of many applications, but they do not meet the demand of other applications such as Text-to-Speech and Republishing. Therefore, there is a desire and need to efficiently identify and correct OCR errors.

SUMMARY

Embodiments of the present disclosure include a method (and corresponding system and computer program product) that identifies and corrects OCR errors.

In one aspect, multiple OCR engines process a text image, and convert it into texts. An error probability estimator compares the outcomes of the multiple OCR engines for mismatches, and determines an error probability for each of the mismatches. If the error probability of a mismatch exceeds an error probability threshold, a suspect is generated and grouped together with similar suspects in a cluster. A question for the cluster is generated and rendered to a human operator for answering. The answer from the human operator is then applied to all suspects in the cluster to correct OCR errors in the resulting text.

In another aspect, the error probability estimator is trained to calculate error probabilities using ground truths. The error probability estimator is also actively trained using the answers provided by the human operator. In addition, clusters with common mismatches are prioritized and questions are generated and rendered for such clusters before other clusters. As a result, the error probability estimator is trained to adapt to the text image more rapidly and generate less false positives.

In yet another aspect, a user interface is generated to render questions to the human operator for answering. The user interface displays a snippet of contextual information of the suspect word, highlights the suspect word, and provides options for the human operator to choose the answer from. The options include corresponding text outputs from the multiple OCR engines and a dialog box for the human operator to type in the answer. The differences among the texts in the options are highlighted. Because the correct answer is usually one of the text outputs given to the user as options, the response time is short which significantly reduces cost.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein efficiently identifies and corrects Optical Character Recognition (OCR) errors. Outputs of multiple OCR engines for the same text images are compared to determine the stability of the outputs, and analyzed for error probabilities. Those outputs with high error probabilities are grouped into clusters based on similarity. A representative question is generated for each cluster and presented to a human operator for answering. The answer is applied to correct OCR errors in the resulting text and train the system to better adapt to the text images and more efficiently identify and correct OCR errors in the text images. As a result, the attention of the human operator is focused on a few areas of the text images that are representative and have high error probabilities. Thus, the computing environment maximizes the automatic process and minimizes the human intervention, and thereby improves system efficiency and reduces cost.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
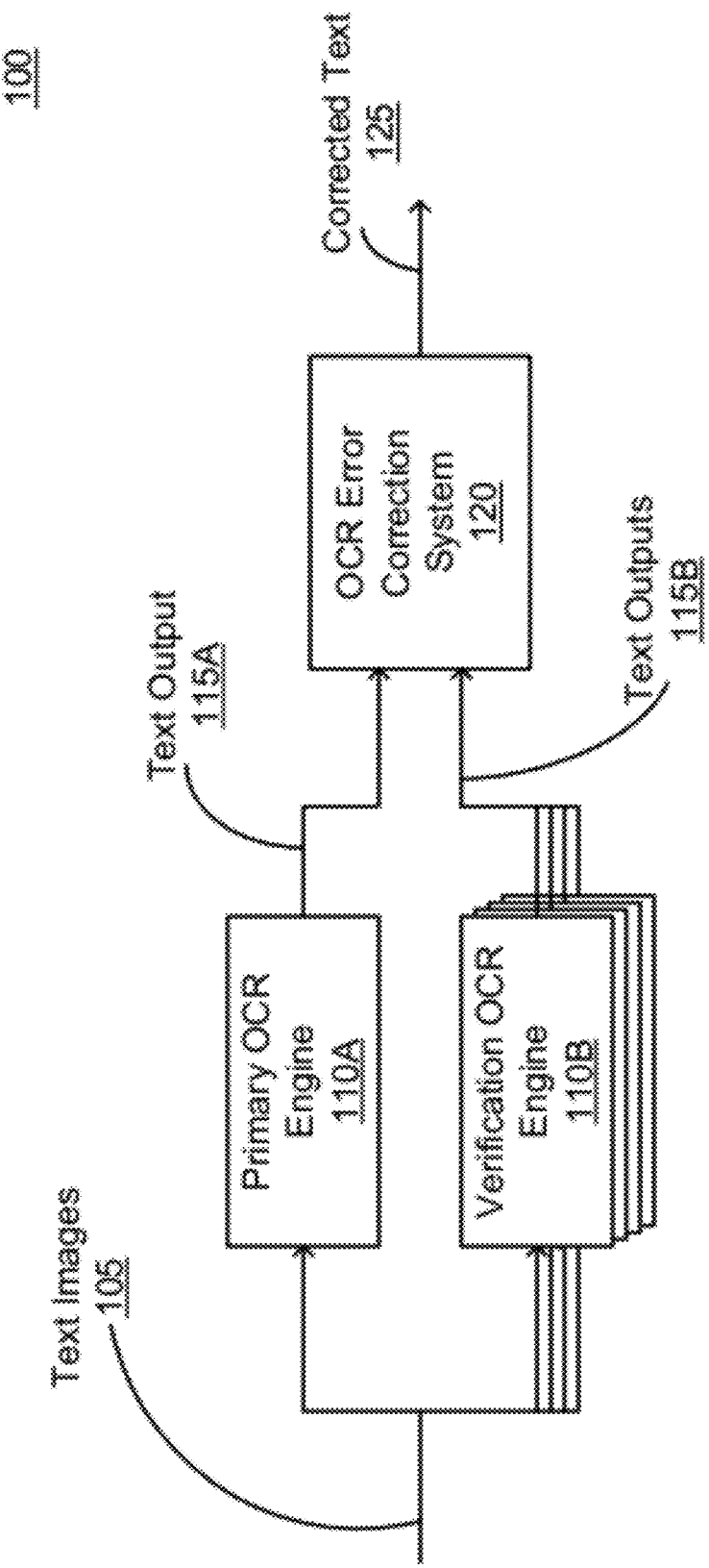
FIG. 1 is a high-level block diagram of a computing environment for identifying and correcting OCR errors through learning according to one embodiment of the present disclosure.

FIG. 1 is a high-level block diagram that illustrates a computing environment 100 for identifying and correcting OCR errors through learning in a multi-engine environment according to one embodiment of the present disclosure. As shown, the computing environment 100 includes a primary OCR engine 110A, multiple verification OCR engines 110B, and an OCR error correction system 120. The OCR engines 110 are communicatively connected with the OCR error correction system 120. Four verification OCR engines 110B are shown in FIG. 1 for purposes of illustration, but the computing environment 100 can have any number of verification OCR engines 110B.

An OCR engine 110 is a hardware device and/or software program configured to convert (or translate) text images 105 into editable text 115. The text images (or graphical representation) 105 are typically generated by a scanner from printed text (e.g., books, newspapers) and fed into the OCR engine 110. The OCR engine 110 processes the text images 105 using computer algorithms and generates corresponding text outputs 115. The OCR engine 110 may be configured to output other information such as the confidence levels of the text output 115 and the corresponding image segments. Examples of the OCR engine 110 include ABBYY FineReader OCR, ADOBE Acrobat Capture, and MICROSOFT Office Document Imaging.

The OCR engines 110 in the computing environment 100 are different from each other (e.g., different providers, versions, configurations). The role of the primary OCR engine (or master OCR engine, main OCR engine) 110A is to provide text output (or primary text output) 115A for the OCR error correction system 120 to incorporate into the corrected text 125. The role of a verification OCR engine (or secondary OCR engine) 110B is to provide text output (or verification text output) 115B for the OCR error correction system 120 to verify the primary text output 115A. In one embodiment, the more advanced OCR engine (e.g., better accuracy) is selected as the primary OCR engine 110A.

According to one embodiment, one or more of the verification OCR engines 110B (or the primary OCR engine 110A) can be configured to provide additional information, such as a sorted list of text candidates (called a "mutual rank") and their corresponding confidence levels. Alternatively or in addition, one or more of the verification OCR engines 110B can be configured to provide a confidence level (called a "mutual confidence level") of the text output 115A of the primary OCR engine 110A.

The OCR error correction system 120 is a computer system configured to identify and correct OCR errors generated by the OCR engines 110 and output the corrected text 125 for the text images 105. The OCR error correction system 120 receives the text outputs 115 along with other outputs (e.g., confidence levels and image segments) from the OCR engines 110, and determines the stability of the primary text output 115A and its error probability. The OCR error correction system 120 identifies the primary text output 115A with high error probabilities as suspects and groups suspects into clusters based on similarity. The OCR error correction system 120 generates a representative question for each cluster and presents the question to a human operator for answering. The OCR error correction system 120 generates the corrected text 125 based on the inputs from the OCR engines 110 and the human operator. The corrected text 125 can then be stored or processed further (e.g., indexed, searched, analyzed). An example structure and operation of the OCR error correction system 120 is described in further detail below in relation to FIGS. 3-5.

Computer Architecture

Figure 2:
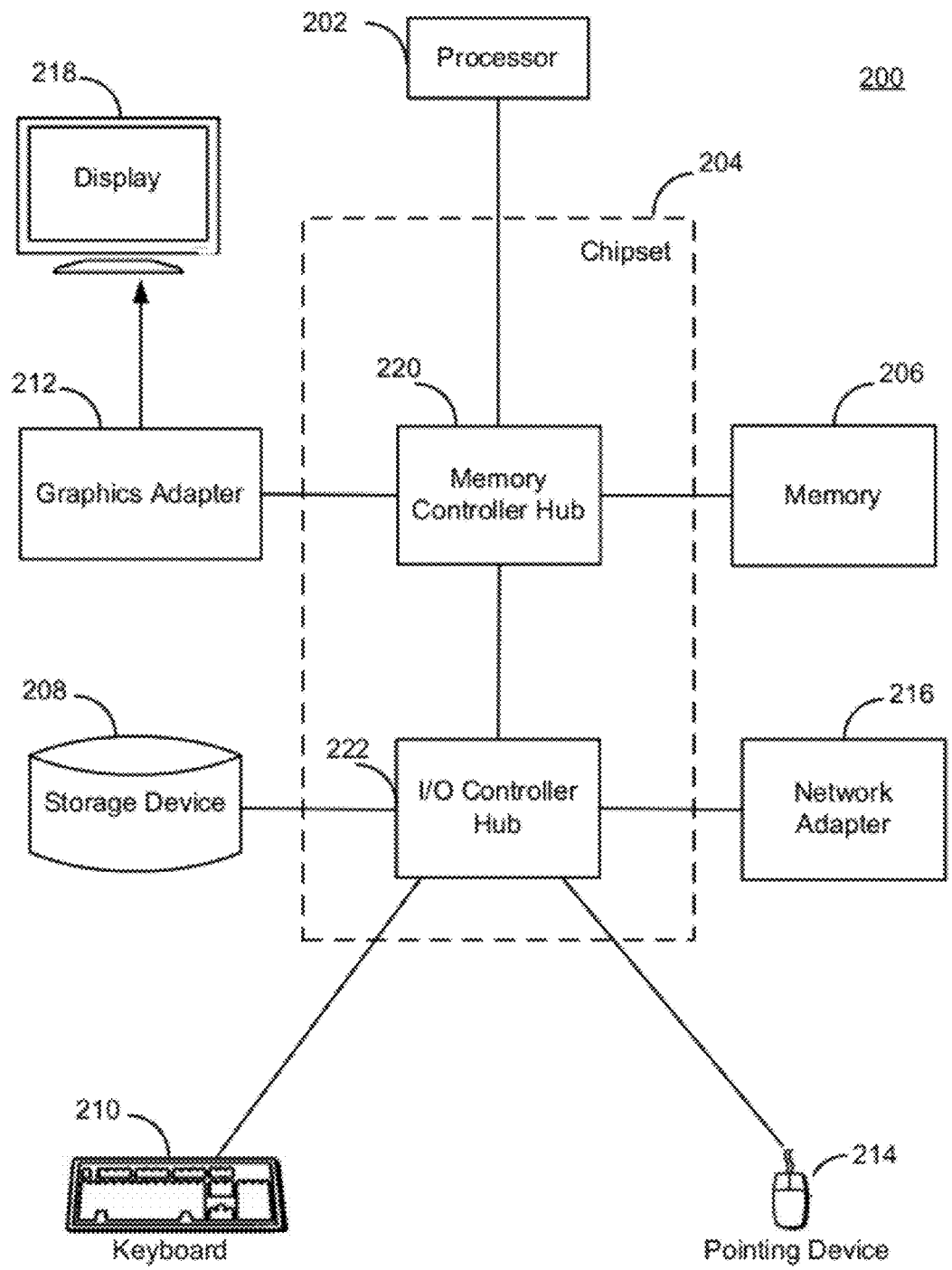
FIG. 2 is a high-level block diagram illustrating an example of a computer for use in the computing environment shown in FIG. 1 according to one embodiment of the present disclosure.

The OCR engine 110 and the OCR error correction system 120 shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the OCR error correction system 120 might comprise multiple blade servers working together to provide the functionality described herein.

Example Architectural Overview of the OCR Error Correction System

Figure 3:
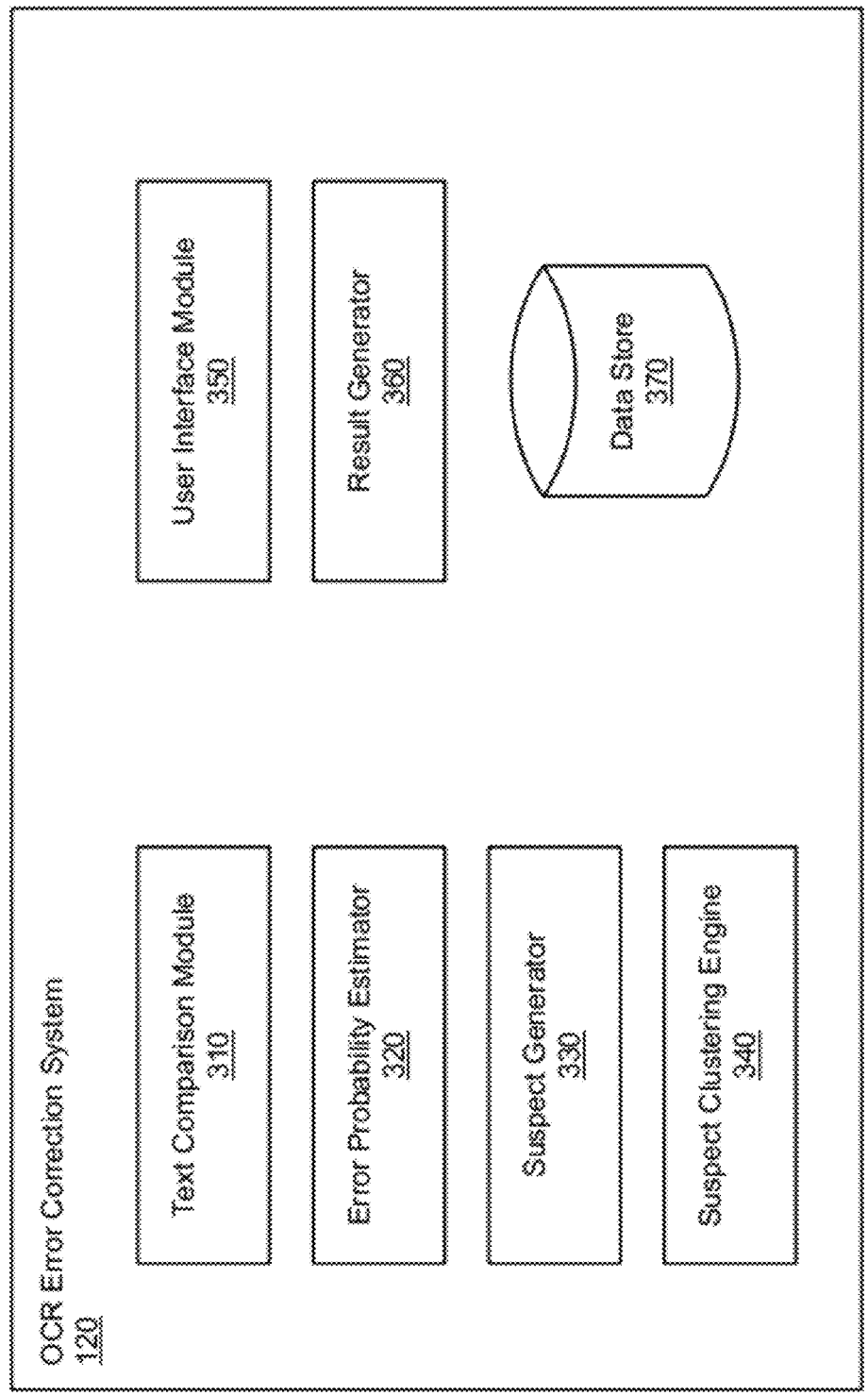
FIG. 3 is a high-level block diagram illustrating modules within an OCR error correction system shown in FIG. 1 according to one embodiment of the present disclosure.

FIG. 3 is a high-level block diagram illustrating a detailed view of modules within the OCR error correction system 120 according to one embodiment. Some embodiments of the OCR error correction system 120 have different and/or other modules than the ones described herein. Similarly, the functions can be distributed among the modules in accordance with other embodiments in a different manner than is described here. As illustrated, the OCR error correction system 120 includes a text comparison module 310, an error probability estimator 320, a suspect generator 330, a suspect clustering engine 340, a user interface module 350, a result generator 360, and a data store 370.

The text comparison module 310 compares the output text received from multiple OCR engines 110. It is observed that different OCR engines 110 tend to make different mistakes. Therefore, by comparing the text outputs 115 of multiple OCR engines 110 for disagreements (or mismatches), the OCR error correction system 120 can identify words (or text segments) that may contain OCR errors.

The error probability estimator 320 estimates an error probability for the text output 115A received from the primary OCR engine 110A. An error probability is a value that measures the likelihood of the associated text containing one or more OCR errors. In one embodiment, the error probability estimator 320 is trained using machine learning technology (e.g., neural networks) based on ground truths to estimate error probabilities. The error probability estimator 320 retrieves information related to the text, such as the confidence level from the primary OCR engine 110A, and the mutual confidence level from the verification OCR engine 110B, and calculates an error probability for the text. The error probability estimator 320 is described in further detail below.

The suspect generator 330 generates suspects (also called suspect interpretations) based on the error probabilities provided by the error probability estimator 320. A suspect includes a text output 115A from the primary OCR engine 110A that is likely to contain OCR errors. For purpose of clarity, it is assumed the text output 115A is a word, but those of skill in the art will recognize that the text segment can be a phrase, a character, a sentence, and so on. The suspect also contains other information such as the word's confidence level, mutual confidence level, and corresponding image segment. In one embodiment, the suspect generator 330 determines whether to generate a suspect for a given word by comparing its error probability with a threshold value (hereinafter called an error probability threshold). If the word's error probability is below the threshold value, the suspect generator 330 considers the word accurate (e.g., free from OCR errors) and passes it to the result generator 360 to include in the resulting text. Otherwise, the suspect generator 330 generates a suspect for the word and passes the suspect to the suspect clustering engine 340 for further analysis. Thus, the suspect generator 330 only generates suspects for those words with high error probabilities (exceeding the threshold).

The error probability threshold can be predetermined and adjusted based on the need and budget (e.g., time, money). For example, if the accuracy requirement for the corrected text 125 is relatively high, the threshold can be set relative low. As a result, more words will have error probabilities higher than the threshold and the suspect generator 330 will generate more suspects. As another example, if the budget is relatively tight, the threshold can be set relatively high. As a result, fewer words will have error probabilities higher than the threshold and the suspect generator 330 will generate fewer suspects. As will be described in detail later, fewer questions will be rendered to the human operator and thus the cost will be reduced.

The suspect clustering engine 340 groups suspects into clusters based on their similarity. In one embodiment, the suspect clustering engine 340 measures similarity based on the suspects' words and corresponding image segments. The suspect clustering engine 340 also generates a representative question for each cluster and passes the question to the user interface module 350 to render to the human operator. The suspect clustering engine 340 is described in further detail below.

The user interface module 350 presents the representative question received from the suspect clustering engine 340 to a human operator and receives an answer from the human operator. In one embodiment, to facilitate the human operator to more accurately and efficiently answer the rendered question, the user interface module 350 displays contextual information of the suspect word and lists the text outputs 115 for selection along with a dialog box for the human operator to type in the answer if necessary. An example user interface generated by the user interface module 350 is described in further detail below in relation to FIG. 6. The user interface module 350 can distribute the questions among multiple human operators.

The result generator 360 generates corrected text 125 for the text images 105 based on inputs from the OCR engines 110 and the human operator. When the human operator answers a question, the answer is applied to all suspects in the cluster represented by the question. The result generator 360 corrects OCR errors based on the answers in the corrected text 125 and outputs the corrected text 125. In one embodiment, the result generator 360 also routes the answer to the error probability estimator 320 to further adapt it for the text images 105 and further enhance the effectiveness of the OCR error correction system 120.

The data store 370 stores data used by the OCR error correction system 120 to identify and correct OCR errors. Examples of such data include information about the OCR engine 110, ground truths, suspects, past questions shown to the human operator and corresponding answers. The data store 370 may also store the corrected text 125 generated by the result generator 360. The data store 370 may be a relational database or any other type of database that stores the data, such as a flat file.

The OCR error correction system 120 can include other components, such as a screen for displaying the user interface rendered by the user interface module 350 and input devices for the human operator to input answers.

Error Probability Estimator

As described above, the error probability estimator 320 produces an error probability for the text output 115A received from the primary OCR engine 110A. The produced error probability is a numeric value in the range of 0 and 1. The higher the error probability, the more confident the error probability estimator 320 is that the corresponding text output 115A contains OCR errors and should be resolved by a human operator. The value 0 indicates complete confidence that the text is free from OCR errors, and the value 1 indicates complete confidence that the text contains one or more OCR errors.

In one embodiment, the error probability estimator 320 implements a general purpose algorithm that can train the error probability estimator 320 to estimate error probabilities using artificial intelligence techniques such as neural networks. Initially, the error probability estimator 320 observes ground truths to learn how to estimate error probabilities. The ground truths include a large corpus of words and their related information (e.g., corresponding words outputted by the verification OCR engine 110B, confidence levels, and corresponding image segments), and whether the words actually contain OCR errors and related information (e.g., number of errors and their corresponding type). The error probability estimator 320 learns from the ground truths how to map inputs (e.g., texts from the OCR engines 110, confidence levels) to outputs (e.g., a numeric value between 0 and 1), and thus can subsequently estimate error probabilities based on new inputs.

In addition to the inputs provided by the OCR engines 110, the error probability estimator 320 can be configured to request and retrieve additional information from the OCR engines 110 (e.g., mutual confidence level, mutual rank) and/or calculate additional factors (or features). For example, the error probability estimator 320 can use pre-computed character trigram models to compute a score for a suggested word. For example, the word "triangle" has 5 character trigrams: "tri", "ria", "ian", "ang", "ngl", "gle". The error probability estimator 320 looks up the probability of each of these trigrams in the trigram model and computes an overall score of the word. These additional inputs and factors can be used for the error probability estimator 320 to estimate the error probabilities. It is noted that for different types of OCR errors, the error probability estimator 320 may consider different factors (or give different weights to the same factors). For example, for segmentation errors (a single word being mistakenly recognized as two or more words), the error probability estimator 320 considers the distances among the characters in the corresponding text output 115 (e.g., number of pixels), while for substitution errors (one word being mistakenly recognized as another), such information may be given minimum weight, or not considered at all.

Alternatively or in addition, the error probability estimator 320 can be configured to start with adjustable rules for producing error probabilities such as the following: if text outputs 115 from both OCR engines 110 match and have high confidence levels then produce a low error probability such as 0, and if text outputs 115 mismatch and have low confidence levels then produce a high error probability such as 1. These rules can be adjusted based on subsequent learning from the ground truths and answers from the human operator.

In one embodiment, the error probability estimator 320 retrieves answers and corresponding suspects from the result generator 360 and further trains itself based on them. Because the answers are provided by a human operator, they can essentially be treated as additional ground truths. This is beneficial because it can rapidly adapt the error probability estimator 320 to the text images 105. It is observed that certain books (or publisher or newspaper) may use a particular font that tends to trigger the OCR engines 110 to generate OCR errors. By actively learning from the answers, the error probability estimator 320 can dynamically adjust itself to better process such text images 105. For example, if the human operator indicates that the verification OCR engine 110B consistently generates errors and the primary OCR engine 110A is consistently correct for certain words, the error probability estimator 320 can learn to give less weight to the disagreements between the text outputs 115.

Suspect Clustering Engine

As described above, the suspect clustering engine 340 groups suspects into clusters based on similarity. In one embodiment, the suspect clustering engine 340 groups suspects by first comparing their words for matches. If two suspects share the same word, the suspect clustering engine 340 then compares their corresponding image segments (e.g., pixel by pixel comparison). If the two image segments are sufficiently similar (e.g., pixel difference below a threshold), the suspect clustering engine 340 considers them identical and groups them in the same cluster.

For example, a book about dogs contains the word "dog" in an uncommon font (e.g., Monotype Corsiva) and a specific size (e.g., 12 pt.). The primary OCR engine 110A consistently recognizes such image segments as "clog". The error probability estimator 320 estimates high error probabilities for such outcomes from the primary OCR engine 110A, and the suspect generator 330 creates suspects accordingly. Because the words associated with the suspects ("clog") are the same and the corresponding image segments are essentially the same, the suspect clustering engine 340 groups them into a same cluster. If an image segment actually contains the word "clog" and a suspect is created for the image segment, the segment will not be grouped into the above cluster because the image segments would not match.

Because a typical book (or books of a typical publisher) contains only a limited number of fonts (and font sizes), OCR errors occurring in processed images scanned from the same book (or books of the same publisher) tend to repeat for a small group of words. Rather than asking essentially the same question repeatedly to the human operator for the same answer, it is more efficient to ask the question once and reuse the answer for similar situations. By clustering similar suspects into clusters and only asking a representative question for each cluster, the OCR error correction system 120 can dramatically reduce the number of questions to ask the human operator. The answer will be applied to all suspects in the cluster, including those subsequent grouped into the cluster.

In addition, the OCR error correction system 120 can compile a profile cluster database for a particular publication (e.g., book, newspaper) or a particular type of publication (e.g., publications from a specific publisher, published during a specific time period, and/or published in a specific geographic area), and apply the clusters for publications with the same or similar characteristics, thereby further improving system efficiency and reducing related cost.

Active Learning

In one embodiment, the OCR error correction system 120 prioritizes those clusters of suspects that potentially may train the error probability estimator 320 to better adapt to the text images 105. This prioritization process is referred to as active learning.

For example, by analyzing the generated suspects the OCR error correction system 120 notices that the text output 115A from the primary OCR engine 110A consistently disagrees with the text output 115B from the verification OCR engine 110B over whether a substring is "d" or "cl". As a result, the OCR error correction system 120 can prioritize a cluster containing suspects with words that contain multiple "d"s (or "cl"s) and prompt a question to the human operator for answering. Based on the answer, the error probability estimator 320 can adjust its logic to adjust its weight given to such disagreements, such that it may produce fewer suspects because of this adjustment and thus enhance system efficiency and reduce cost. The OCR error correction system 120 may also consider other factors in prioritizing clusters such as the number of suspects in the clusters.

Active learning may effectively reduce the number of false positives, the incidence when the output text 115A from the primary OCR engine 110A is actually OCR error free. For example, if the verification OCR engine 110B consistently mistakenly recognizes a substring and generates a false alarm that the primary OCR engine 110A's output text 115A is erroneous when it is really not, the OCR error correction system 120 prompts the human operator to identify this early on, such that the error probability estimator 320 can be trained to safely ignore such disagreements later and prevents repeating false positives.

Overview of Methodology

Figure 4:
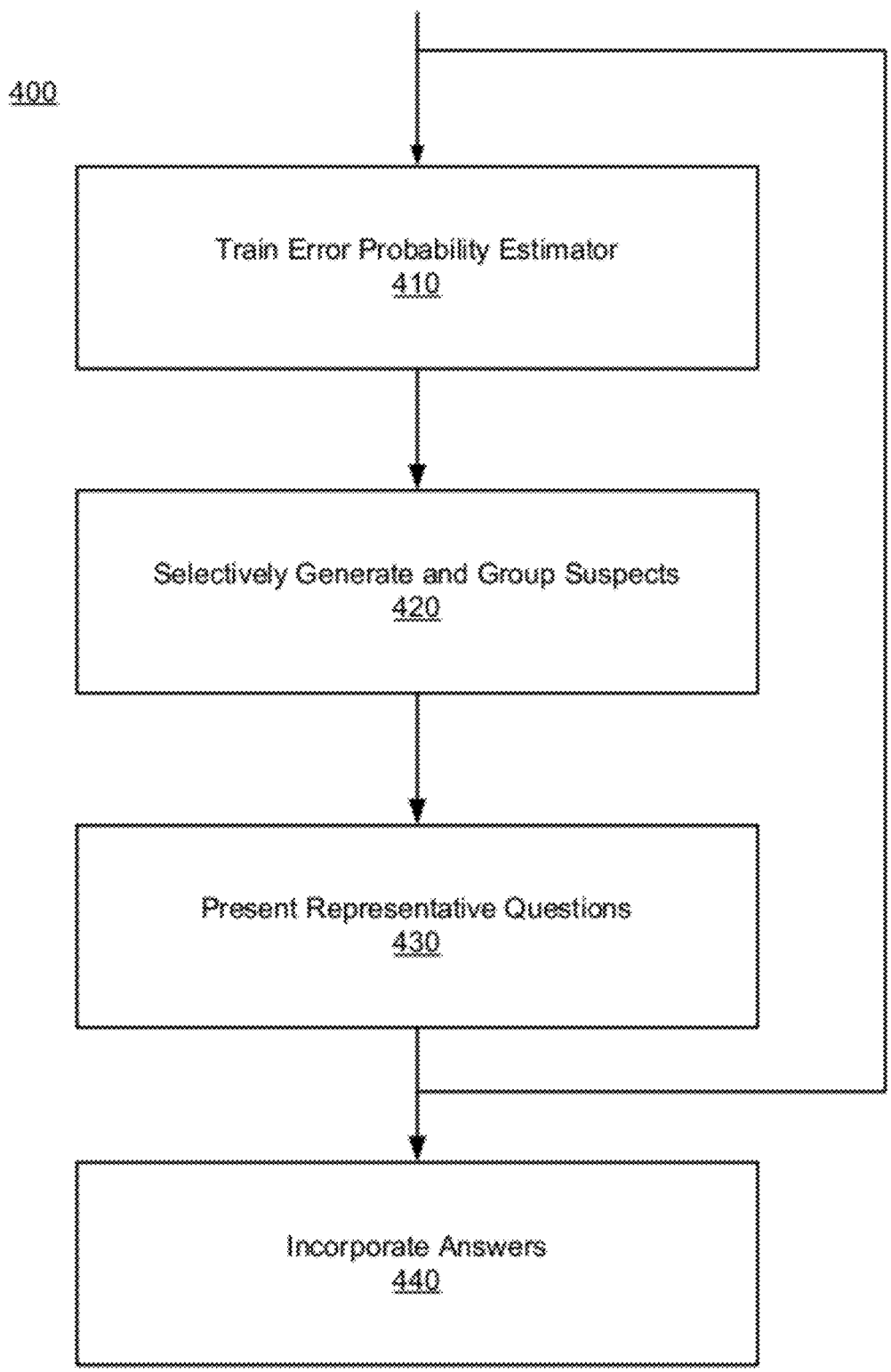
FIG. 4 is a flow diagram that illustrates the operation of the OCR error correction system shown in FIGS. 1 and 3 according to one embodiment of the present disclosure.

FIG. 4 is a flowchart illustrating a method 400 for the OCR error correction system 120 to identify and correct OCR errors according to one embodiment. Other embodiments can perform the steps of the method 400 in different order. Moreover, other embodiments can include different and/or additional steps than the ones described herein. The OCR error correction system 120 can perform multiple instances of the steps of the method 400 concurrently and/or in parallel.

Initially, the OCR error correction system 120 trains 410 the error probability estimator 320 using ground truths. As described above, the error probability estimator 320 may be configured to have a few initial rules for estimating error probabilities that may be adjusted subsequently during the training process. Once the error probability estimator 320 is trained, the OCR error correction system 120 selectively generates and groups 420 suspects into clusters based on text outputs 115 received from the OCR engines 110, and presents 430 representative questions for the clusters to a human operator for answering. The answers are then incorporated 440 into the corrected text 125 for the text images 105. In addition, the answers are also used to further train 410 the error probability estimator 320 to better estimate error probabilities. In one embodiment, the answers can also be used to adjust the error probability threshold.

The steps 420-440 are described in further detail below in relation to FIG. 5.

Process to Identify

Figure 5:
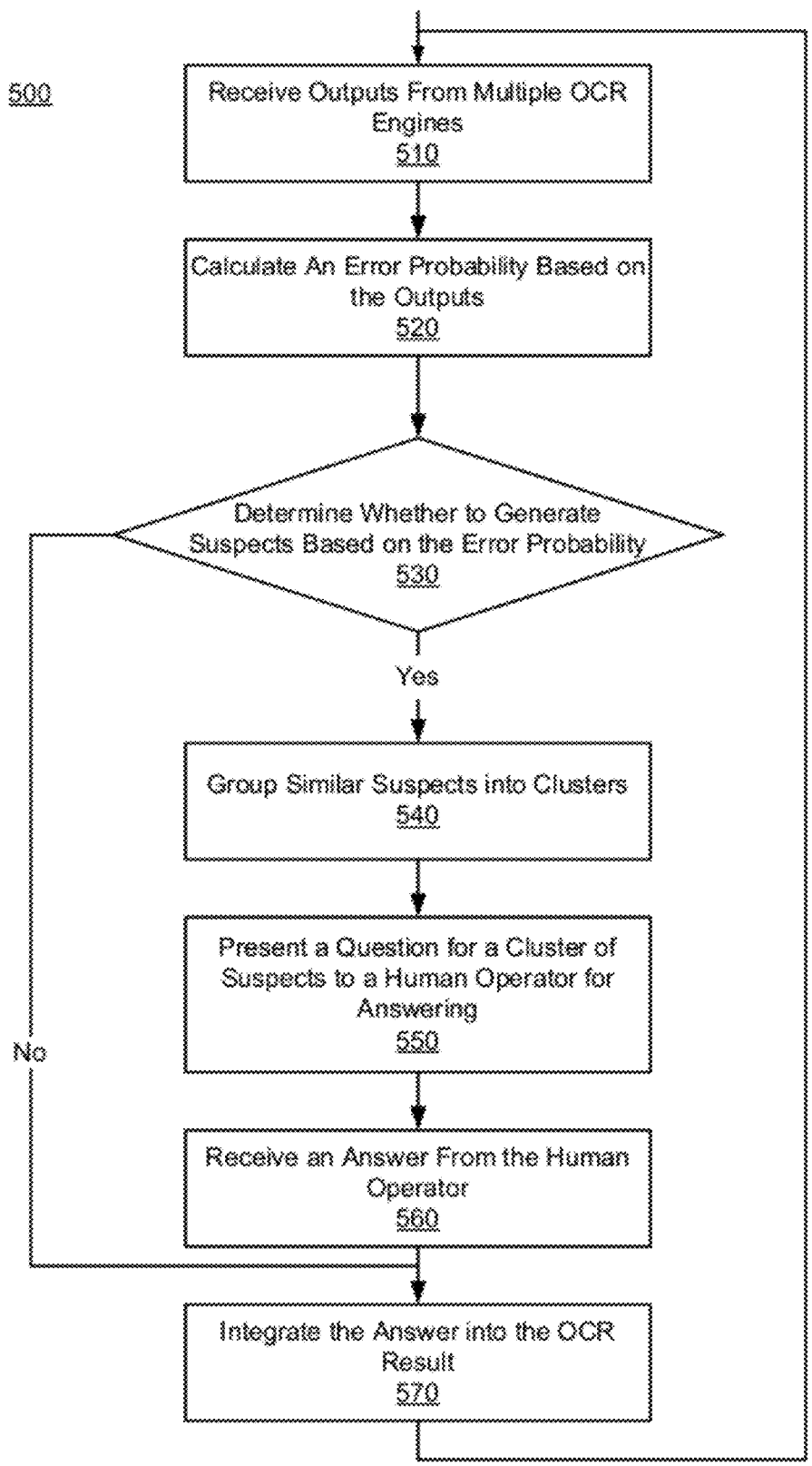
FIG. 5 is a flow diagram that illustrates a method to identify and correct OCR errors according to one embodiment of the present disclosure.

FIG. 5 is a flow diagram that illustrates a method 500 for the OCR error correction system 120 to identify and correct OCR errors according to one embodiment. The method 500 corresponds to steps 420-440 in FIG. 4.

As shown, the OCR error correction system 120 receives 510 outputs from multiple OCR engines 110, and calculates 520 an error probability based on the text outputs 115 (e.g., through the error probability estimator 320). In one embodiment, the OCR error correction system 120 compares the text outputs 115 from the multiple OCR engines 110 (e.g., through the text comparison module 310) and calculates 520 the error probability only if there is one or more disagreements among the outputs. If the text outputs 115 match, the OCR error correction system 120 assumes the text output 115A of the primary OCR engine 110A is free of OCR errors, skips steps 520-560, and integrates 570 the output text 115A into the corrected text 125.

The OCR error correction system 120 determines 530 whether to generate a suspect for the current text output 115A by comparing its error probability to the error probability threshold. If the error probability is below the threshold, the OCR error correction system 120 skips steps 520-560, and integrates 570 the output text 115A into the corrected text 125. Otherwise, the OCR error correction system 120 generates a suspect for the output text 115A (e.g., through the suspect generator 330).

The OCR error correction system 120 groups 540 similar suspects into clusters (e.g., through the suspect clustering engine 340), and presents 550 a representative question for each cluster to a human operator (e.g., through the user interface module 350). The OCR error correction system 120 receives 560 the answer and integrates 570 it into the corrected text 125 (e.g., through the result generator 360). In one embodiment, when a suspect is created for an output text 115A of the primary OCR engine 110A, the result generator 360 temporarily uses the output text 115A in the corrected text 125. When an answer is received 560 for the representative question of the cluster including the suspect, the result generator 360 applies the answer to all suspects in the cluster, and modifies the corrected text 125 only if the answer differs from the output text 115A.

User Interface

Figure 6:
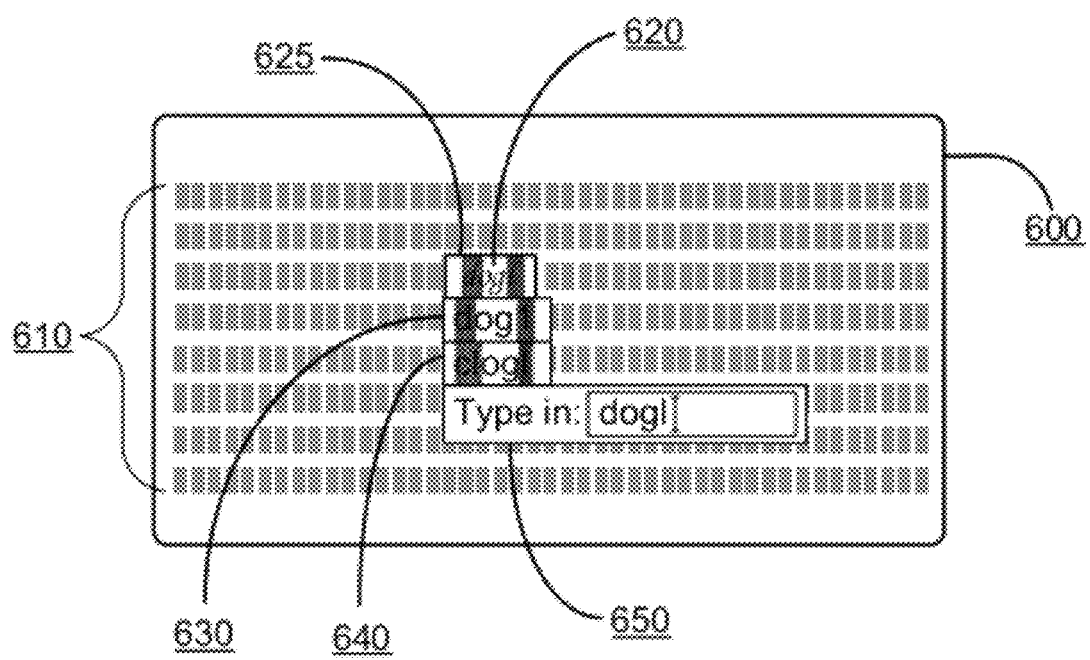
FIG. 6 is a screenshot illustrating a user interface generated by the OCR error correction system shown in FIGS. 1 and 3 for a human operator according to one embodiment of the present disclosure.

FIG. 6 is a screenshot illustrating a user interface 600 generated for a representative question for a human operator to answer according to one embodiment of the present disclosure. As shown, the user interface 600 contains a snippet 610 of the text image 105 containing a suspect word 620. A box 625 is drawn around the suspect word 620 ("dogl"). The user interface 600 displays multiple options right below the box 625 for the human operator to select the answer from. The options include an option 630 for the primary text output 115A ("dogl") and an option 640 for the verification text output 115B ("clogl"), with their distinctions highlighted. For example, the character 'd' and the number '1' of the primary text output 115A and the string "cl" and the character 'l' of the verification text output 115B are highlighted, and their common substring "og" is not. The sections of the suspect word 620 corresponding to the distinctions, "d" and "l" in the present example, are also highlighted in the box 625. The options also include a dialog box 650 in which the human operator can provide an answer that matches the suspect word 620 ("dogl") if necessary.

The snippet 610 conveniently provides the human operator with contextual information of the suspect word 620. The box 625 is designed to attract the human operator's attention such that the human operator can quickly focus on the question. The options 630-650 are conveniently located to enable the human operator to quickly select an answer or input an answer if necessary. It is observed that in the vast majority of times, the answer is among the output texts 115, and therefore, the human operator often only needs to make a selection, and does not need to type in the dialog box 650. By highlighting the differences between the output texts 115, the user interface 600 enables the human operator to focus on their distinctions, and thereby rapidly and accurately makes a selection or input the answer. As a result, the user interface 600 can decrease the cognitive load (the time the human operator takes to absorb the context), and reduces the response time and human mistakes.

Alternative Embodiments

The above description is related to efficiently identifying and correcting OCR errors through learning in a multi-engine environment. One skilled in the art will readily recognize from the description that alternative embodiments of the disclosure may be employed to identify and correct OCR errors. For example, the OCR error correction system 120 can utilize more than 2 OCR engines to improve the quality of OCR output. In addition, rather than utilizing multiple OCR engines, a same document can be scanned multiple times (e.g., applying different angle, brightness, or use different scanner), and processed by a same OCR engine 110. The OCR error correction system 120 can process the multiple outputs of the same OCR engine 110 to identify and correct OCR errors in a manner similar to what described herein.

The above description can also be used to automatically identify portions of a document that need special attention (e.g., pages that are spoiled, pages that include text of a different language). It is observed that there is a high correlation between a suspect per word rate and the actual OCR error rate. Therefore, if there is a spike of suspect per word rate for a certain section of the scanned document, it can be determined that the section has a high OCR error rates and needs special treatment (e.g., reconfigure the OCR engine or rescan such pages).

The above description also provides a mechanism to control the cost related to OCR error identification and correction. Because a majority of the cost involved in the process is incurred to have the human operator(s) answering the generated question, the cost can be controlled by adjusting the number of questions that will be rendered to the human operator. Because the error probability threshold affects the number of questions generated for the human operator, one can set (or adjust) the threshold based on budget. As a result, the system can be pre-configured based on budget to maximize its efficiency in identifying and correcting OCR errors.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying and correcting OCR errors. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of correcting Optical Character Recognition (OCR) errors, comprising:
   converting a graphical representation of an original segment of text into a first segment of text using a first OCR engine;
   converting the graphical representation of the original segment of text into a second segment of text using a second OCR engine;
   estimating an error probability for the first segment of text by matching the first segment of text with the second segment of text;
   responsive to the error probability exceeding a predetermined threshold value, generating a suspect interpretation for the first segment of text;
   grouping the suspect interpretation with other similar suspect interpretations to form a cluster of suspect interpretations by:
   comparing the first segment of text with another segment of text of another suspect interpretation;
   responsive to the first segment of text matching the other segment of text, comparing the graphical representation of the original segment of text with a graphical representation of the other segment of text; and
   responsive to the graphical representation of the original segment of text being sufficiently similar to the graphical representation of the other segment of text, grouping the suspect interpretation with the other suspect interpretation in the cluster;
   generating a representative question for the cluster;
   determining a correct answer for the representative question; and
   generating a corrected segment of text based on the correct answer, the corrected segment of text matching the original segment of text.

2. The method of claim 1, further comprising:
   presenting the representative question to a human operator via a user interface;
   receiving the correct answer from the human operator; and
   applying the correct answer to all suspect interpretations in the cluster to generate corrected segments of text for the suspect interpretations in the cluster.

3. The method of claim 2, further comprising:
   analyzing a previous correct answer to improve estimating the error probability for the first segment of text.

4. The method of claim 2, wherein the user interface displays a snippet of text adjacent to the original segment of text and highlights the original segment of text, wherein the user interface further displays options allowing the human operator to select the correct answer from among a set of answers, wherein the set of answers include the first segment of text, the second segment of text, and a text entry box the human operator can use to provide the correct answer.

5. The method of claim 4, wherein portions of the first segment of text and portions of the second segment of text that differ are highlighted in the user interface.

6. The method of claim 1, wherein estimating the error probability for the first segment of text further comprises:
   responsive to the first segment of text not matching the second segment of text, calculating the error probability for the first segment of text using a confidence level of the first segment of text and a confidence level of the second segment of text.

7. A non-transitory computer-readable storage medium containing executable computer program code for performing a method of correcting Optical Character Recognition (OCR) errors comprising:
   converting a graphical representation of an original segment of text into a first segment of text using a first OCR engine;
   converting the graphical representation of the original segment of text into a second segment of text using a second OCR engine;
   estimating an error probability for the first segment of text by matching the first segment of text with the second segment of text;
   responsive to the error probability exceeding a predetermined threshold value, generating a suspect interpretation for the first segment of text;
   grouping the suspect interpretation with other similar suspect interpretations to form a cluster of suspect interpretations by:
   comparing the first segment of text with another segment of text of another suspect interpretation;

responsive to the first segment of text matching the other segment of text, comparing the graphical representation of the original segment of text with a graphical representation of the other segment of text; and responsive to the graphical representation of the original segment of text being sufficiently similar to the graphical representation of the other segment of text, grouping the suspect interpretation with the other suspect interpretation in the cluster;

generating a representative question for the cluster;

determining a correct answer for the representative question; and generating a corrected segment of text based on the correct answer, the corrected segment of text matching the original segment of text.

8. The non-transitory computer-readable storage medium of claim 7, wherein the method further comprises:

presenting the representative question to a human operator via a user interface;

receiving the correct answer from the human operator; and applying the correct answer to all suspect interpretations in the cluster to generate corrected segments of text for the suspect interpretations in the cluster.

9. The non-transitory computer-readable storage medium of claim 8, wherein the method further comprises:

analyzing a previous correct answer to improve estimating the error probability for the first segment of text.

10. The non-transitory computer-readable storage medium of claim 8, wherein the user interface displays a snippet of text adjacent to the original segment of text and highlights the original segment of text, wherein the user interface further displays options allowing the human operator to select the correct answer from among a set of answers, wherein the set of answers include the first segment of text, the second segment of text, and a text entry box the human operator can use to provide the correct answer.

11. The non-transitory computer-readable storage medium of claim 10, wherein portions of the first segment of text and portions of the second segment of text that differ are highlighted in the user interface.

12. The non-transitory computer-readable storage medium of claim 7, wherein estimating the error probability for the first segment of text further comprises:

responsive to the first segment of text not matching the second segment of text, calculating the error probability for the first segment of text using a confidence level of the first segment of text and a confidence level of the second segment of text.

13. A computer system for correcting Optical Character Recognition (OCR) errors, the computer system comprising:

a non-transitory computer-readable storage medium storing executable computer program instructions for correcting Optical Character Recognition (OCR) errors, the computer program instructions comprising instructions for:

converting a graphical representation of an original segment of text into a first segment of text using a first OCR engine;

converting the graphical representation of the original segment of text into a second segment of text using a second OCR engine;

estimating an error probability for the first segment of text by matching the first segment of text with the second segment of text;

responsive to the error probability exceeding a predetermined threshold value, generating a suspect interpretation for the first segment of text;

grouping the suspect interpretation with other similar suspect interpretations to form a cluster of suspect interpretations by:

comparing the first segment of text with another segment of text of another suspect interpretation;

responsive to the first segment of text matching the other segment of text, comparing the graphical representation of the original segment of text with a graphical representation of the other segment of text; and responsive to the graphical representation of the original segment of text being sufficiently similar to the graphical representation of the other segment of text, grouping the suspect interpretation with the other suspect interpretation in the cluster;

generating a representative question for the cluster;

determining a correct answer for the representative question; and generating a corrected segment of text based on the correct answer, the corrected segment of text matching the original segment of text; and a processor configured to execute the computer program instructions stored on the non-transitory computer-readable storage medium.

14. The computer system of claim 13, wherein the computer program instructions further comprises instructions for:

presenting the representative question to a human operator via a user interface;

receiving the correct answer from the human operator; and applying the correct answer to all suspect interpretations in the cluster to generate corrected segments of text for the suspect interpretations in the cluster.

15. The computer system of claim 14, wherein the computer program instructions further comprises instructions for:

analyzing a previous correct answer to improve estimating the error probability for the first segment of text.

16. The computer system of claim 14, wherein the user interface displays a snippet of text adjacent to the original segment of text and highlights the original segment of text, wherein the user interface further displays options allowing the human operator to select the correct answer from among a set of answers, wherein the set of answers include the first segment of text, the second segment of text, and a text entry box the human operator can use to provide the correct answer.

17. The computer system of claim 16, wherein portions of the first segment of text and portions of the second segment of text that differ are highlighted in the user interface.

18. The computer system of claim 13, wherein estimating the error probability for the first segment of text further comprises:

responsive to the first segment of text not matching the second segment of text, calculating the error probability for the first segment of text using a confidence level of the first segment of text and a confidence level of the second segment of text.

* * * * *